(12) United States Patent
Pratt et al.

(10) Patent No.: US 10,957,904 B2
(45) Date of Patent: Mar. 23, 2021

(54) SOLID STATE BATTERY CATHODE MATERIAL

(71) Applicant: Robert Bosch GmbH, Stuttgart (DE)

(72) Inventors: Russell Pratt, San Mateo, CA (US); Yan Li, Fremont, CA (US); Xiaoliang Wang, Alameda, CA (US); Hany Eitouni, Oakland, CA (US)

(73) Assignee: Robert Bosch GmbH, Stuttgart (DE)

( * ) Notice: Subject to any disclaimer, the term of this patent is extended or adjusted under 35 U.S.C. 154(b) by 77 days.

(21) Appl. No.: 16/430,920

(22) Filed: Jun. 4, 2019

(65) Prior Publication Data

US 2020/0388831 A1 Dec. 10, 2020

(51) Int. Cl.
*H01M 4/36* (2006.01)
*H01M 4/62* (2006.01)
(Continued)

(52) U.S. Cl.
CPC ............. *H01M 4/366* (2013.01); *C08F 30/02* (2013.01); *H01M 4/622* (2013.01);
(Continued)

(58) Field of Classification Search
CPC .. H01M 4/366; H01M 4/622; H01M 10/0565; H01M 10/0525; H01M 2300/0082; H01M 2004/028
See application file for complete search history.

(56) References Cited

U.S. PATENT DOCUMENTS 2,934,555 A 4/1960 O'Brien et al.
3,030,347 A 4/1962 O'Brien et al.
(Continued)

FOREIGN PATENT DOCUMENTS

EP 2599832 A1 6/2013
EP 3182499 A1 6/2017

OTHER PUBLICATIONS

J. Forrest Allen et al., "The Synthesis of Monovinyl Esters of Phsophorus (V) Acids," Synthesis of Monovinyl Esters of Phosphorus (V) Acids, May 20, 1955, 5 pages.
(Continued)

*Primary Examiner* — Carlos Barcena
(74) *Attorney, Agent, or Firm* — Brooks Kushman P.C.

(57) ABSTRACT

A solid state battery cathode material includes a first polymer of the general formula

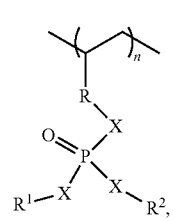

(I)

where R is naught, $C_1$-$C_4$ alkyl, $C_1$-$C_4$ perfluoroalkyl, or $C_1$-$C_4$ alkanone; X is naught, O, S, or $NR^1$; and $R^1$, $R^2$ are H, $C_1$-$C_8$ alkyl, $C_2$-$C_4$ cycloalkyl, $C_1$-$C_8$ perfluoroalkyl, aryl, phenyl, or 1,2-phenylene.

17 Claims, 1 Drawing Sheet

(51) Int. Cl.
*H01M 10/0525* (2010.01)
*H01M 10/0565* (2010.01)
*C08F 30/02* (2006.01)
*H01M 4/02* (2006.01)

(52) U.S. Cl.
CPC ... *H01M 10/0525* (2013.01); *H01M 10/0565* (2013.01); *H01M 2004/028* (2013.01); *H01M 2300/0082* (2013.01)

(56) References Cited

U.S. PATENT DOCUMENTS

| | | | |
|---|---|---|---|
| 9,985,292 | B2 | 5/2018 | Pratt et al. |
| 2004/0142246 | A1 | 7/2004 | Han et al. |
| 2011/0003211 | A1 | 1/2011 | Hudson et al. |
| 2013/0131258 | A1 | 5/2013 | Kwon et al. |
| 2013/0181678 | A1* | 7/2013 | Kourtakis ............. H01M 10/44 320/128 |
| 2015/0303515 | A1 | 10/2015 | Pratt |
| 2020/0220177 | A1* | 7/2020 | Kim .................... H01M 10/052 |

OTHER PUBLICATIONS

Johnston et al., "Synthesis of vinyloxy phosphorus monomers from the enolate of acetaldehyde," Polymer Bulletin 45, 359-364 (2000), 6 pages.

Fan et al., "Materis for Bilogy and Medicine," Journal of Materials Chemistry B, vol. 4, No. 12, Mar. 2016, pp. 2061-2220, 13 pages. (www.rsc.org/MaterialsB).

IN 00908DE2014 A, "Phosphonated Poly Ether Ketone Polymer as an Alternative to Nafion for Polymer Electrolyte Membrane Fuel Cell and the Method of Manufacturing the Same", Indian Institute of Technooogy, Kanpur, Aug. 31, 2016, 31 pages.

European Search Report, EP Application No. EP 20177341, dated Oct. 16, 2020.

* cited by examiner

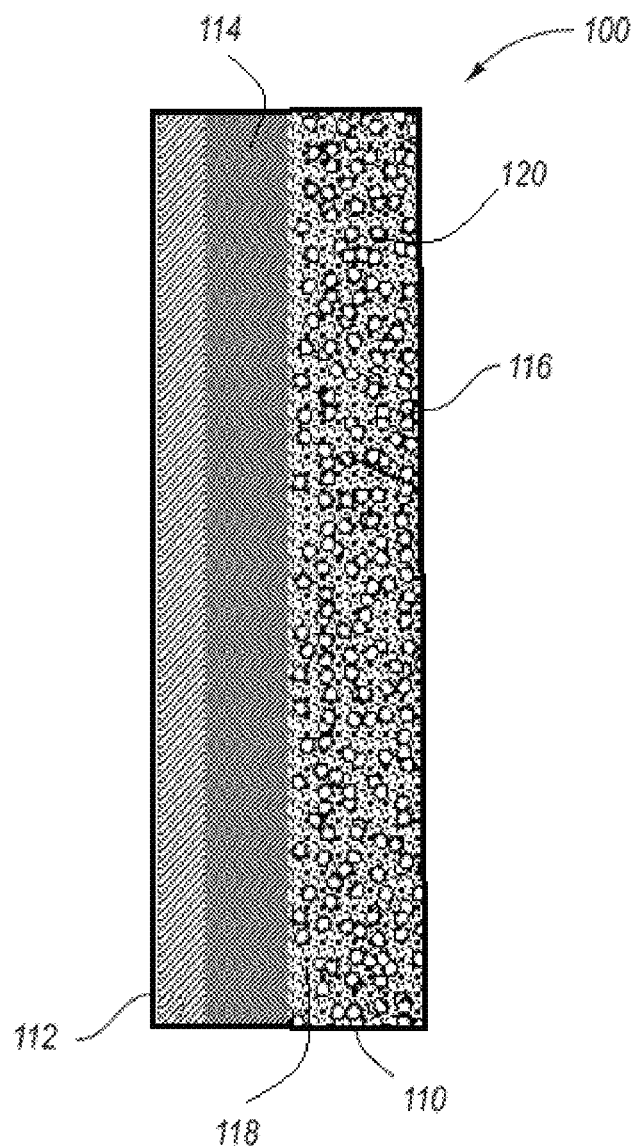

SOLID STATE BATTERY CATHODE MATERIAL

TECHNICAL FIELD

The present disclosure relates to a cathode polymer material, having a phosphoester group in a sidechain, of a solid state battery and a method of making the cathode polymer material.

BACKGROUND

Lithium ion batteries have become a staple among rechargeable batteries. Yet, despite their prevalence, lithium ion batteries are limited in power density, can become a safety hazard when damaged, and feature relatively short lifespans. Solid state batteries are being developed to replace and outperform lithium ion batteries.

SUMMARY

According to one embodiment, a solid state battery cathode material is disclosed. The cathode material includes a first polymer of the general formula (I):

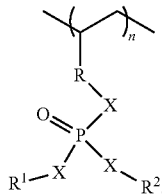
(I)

where R is naught, $C_1$-$C_4$ alkyl, $C_1$-$C_4$ perfluoroalkyl, or $C_1$-$C_4$ alkanone; X is naught, O, S, or $NR^1$; and $R^1$, $R^2$ are H, $C_1$-$C_8$ alkyl, $C_2$-$C_4$ cycloalkyl, $C_1$-$C_8$ perfluoroalkyl, aryl, phenyl, or 1,2-phenylene. The first polymer may be a binder of cathode active material particles. The first polymer may form a coating on cathode active material particles. The cathode active material particles may include $LiFePO_4$, $LiCoO_2$, $LiMn_2O_4$, $Li(NiCoAl)O_2$ (NCA), $Li(NiMnCo)O_2$ (NCM), or a combination thereof. The cathode material may further include a second polymer of the general formula (II):

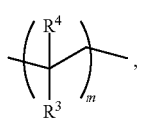
(II)

where $R^3$, $R^4$=H, $C_1$-$C_4$ alkylcarboxy, oligo(ethylene glycol)carboxy, nitrile, $C_1$-$C_6$ alkyl, phenyl, or $C_2$-$C_4$ alkanoate. The first and second polymers may form a random copolymer of the general formula (III):

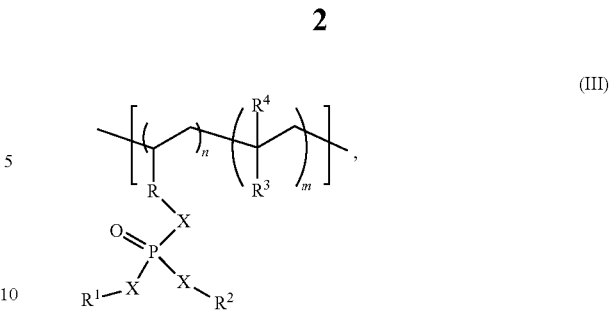
(III)

where R is naught, $C_1$-$C_4$ alkyl, $C_1$-$C_4$ perfluoroalkyl, or $C_1$-$C_4$ alkanone; X is naught, O, S, or $NR^1$; $R^1$, $R^2$ are H, $C_1$-$C_8$ alkyl, $C_2$-$C_4$ cycloalkyl, $C_1$-$C_8$ perfluoroalkyl, aryl, phenyl, or 1,2-phenylene; and $R^3$, $R^4$=H, $C_1$-$C_4$ alkylcarboxy, oligo(ethylene glycol)carboxy, nitrile, $C_1$-$C_6$ alkyl, phenyl, or $C_2$-$C_4$ alkanoate. The first and second polymers may form a block copolymer of the general formula (IV):

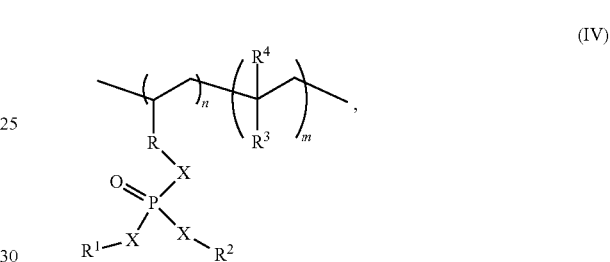
(IV)

where R is naught, $C_1$-$C_4$ alkyl, $C_1$-$C_4$ perfluoroalkyl, or $C_1$-$C_4$ alkanone; X is naught, O, S, or $NR^1$; $R^1$, $R^2$ are H, $C_1$-$C_8$ alkyl, $C_2$-$C_4$ cycloalkyl, $C_1$-$C_8$ perfluoroalkyl, aryl, phenyl, or 1,2-phenylene; and $R^3$, $R^4$=H, $C_1$-$C_4$ alkylcarboxy, oligo(ethylene glycol)carboxy, nitrile, $C_1$-$C_6$ alkyl, phenyl, or $C_2$-$C_4$ alkanoate. The cathode material may further include one or more metal salts mixed in the first polymer. The one or more metal salts may have the general formula (V)

$$MX_n \qquad (V),$$

where M is Li, Na, K, Ca, or Mg; X is triflate, bis(trifluoromethanesulfonimide), bis(perfluoroethylsulfonylimide), $ClO_4$, bis(oxalate-borate), $BF_4B(CN)_4$, or $PF_6$; and n is 1 or 2.

In an alternative embodiment, a solid state polymer battery is disclosed. The battery includes an anode; a cathode comprising a first polymer of the general formula (I):

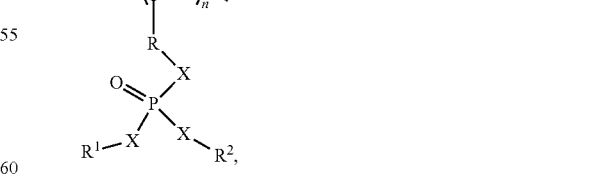
(I)

where R is naught, $C_1$-$C_4$ alkyl, $C_1$-$C_4$ perfluoroalkyl, or $C_1$-$C_4$ alkanone; X is naught, O, S, or $NR^1$; $R^1$, $R^2$ are H, $C_1$-$C_8$ alkyl, $C_2$-$C_4$ cycloalkyl, $C_1$-$C_8$ perfluoroalkyl, aryl, phenyl, or 1,2-phenylene; and a separator electrolyte. The first polymer may form a catholyte. The cathode may further include active material particles and the first polymer forms a coating on the particles. The cathode active material particles may include LiFePO$_4$, LiCoO$_2$, LiMn$_2$O$_4$, Li(NiCoAl)O$_2$ (NCA), Li(NiMnCo)O$_2$ (NCM), or a combination thereof. The cathode may also include a second polymer such that the first and second polymers form a copolymer of the general formula (III) or (IV):

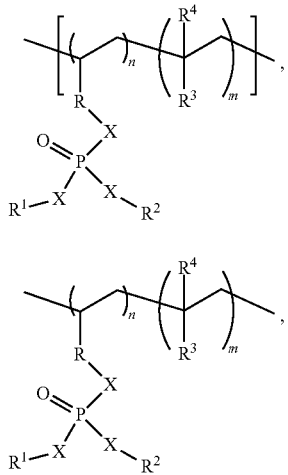

(III)

(IV)

where R is naught, $C_1$-$C_4$ alkyl, $C_1$-$C_4$ perfluoroalkyl, or $C_1$-$C_4$ alkanone; X is naught, O, S, or NR$^1$; R$^1$, R$^2$ are H, $C_1$-$C_8$ alkyl, $C_2$-$C_4$ cycloalkyl, $C_1$-$C_8$ perfluoroalkyl, aryl, phenyl, or 1,2-phenylene; and R$^3$, R$^4$=H, $C_1$-$C_4$ alkylcarboxy, oligo(ethylene glycol)carboxy, nitrile, $C_1$-$C_6$ alkyl, phenyl, or $C_2$-$C_4$ alkanoate. The anode may include graphite, lithium metal lithium alloy(s), silicon, silicon alloy(s), metal oxide(s), silicon oxide(s), silicon carbide(s), or a combination thereof.

In yet another embodiment, a solid state battery catholyte is disclosed. The catholyte includes a first polymer of the general formula (I):

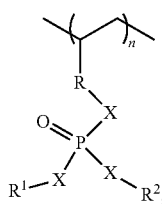

(I)

where R is naught, $C_1$-$C_4$ alkyl, $C_1$-$C_4$ perfluoroalkyl, or $C_1$-$C_4$ alkanone; X is naught, O, S, or NR$^1$; and R$^1$, R$^2$ are H, $C_1$-$C_8$ alkyl, $C_2$-$C_4$ cycloalkyl, $C_1$-$C_8$ perfluoroalkyl, aryl, phenyl, or 1,2-phenylene. The catholyte may further include one or more metal salts of the general formula (V)

MX$_n$ (V), where M is Li, Na, K, Ca, or Mg; X is triflate, bis(trifluoromethanesulfonimide), bis(perfluoroethylsulfonylimide), ClO$_4$, bis(oxalate-borate), BF$_4$, B(CN)$_4$, or PF$_6$; and n is 1 or 2. The catholyte may also include a second polymer of the general formula (II):

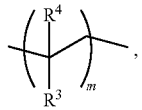

(II)

where R$^3$, R$^4$=H, $C_1$-$C_4$ alkylcarboxy, oligo(ethylene glycol)carboxy, nitrile, $C_1$-$C_6$ alkyl, phenyl, or $C_2$-$C_4$ alkanoate. The first and second polymers may form a random copolymer of the general formula (III):

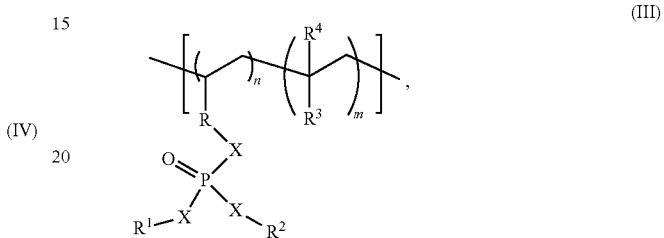

(III)

where R is naught, $C_1$-$C_4$ alkyl, $C_1$-$C_4$ perfluoroalkyl, or $C_1$-$C_4$ alkanone; X is naught, O, S, or NR$^1$; R$^1$, R$^2$ are H, $C_1$-$C_8$ alkyl, $C_2$-$C_4$ cycloalkyl, $C_1$-$C_8$ perfluoroalkyl, aryl, phenyl, or 1,2-phenylene; and R$^3$, R$^4$=H, $C_1$-$C_4$ alkylcarboxy, oligo(ethylene glycol)carboxy, nitrile, $C_1$-$C_6$ alkyl, phenyl, or $C_2$-$C_4$ alkanoate. The first and second polymers may form a block copolymer of the general formula (IV):

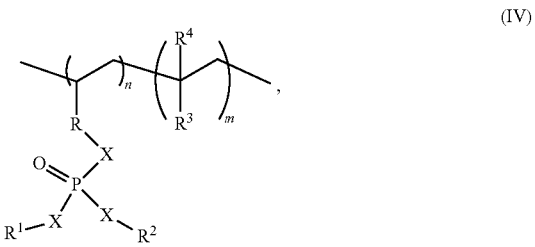

(IV)

where R is naught, $C_1$-$C_4$ alkyl, $C_1$-$C_4$ perfluoroalkyl, or $C_1$-$C_4$ alkanone; X is naught, O, S, or NR$^1$; R$^1$, R$^2$ are H, $C_1$-$C_8$ alkyl, $C_2$-$C_4$ cycloalkyl, $C_1$-$C_8$ perfluoroalkyl, aryl, phenyl, or 1,2-phenylene; and R$^3$, R$^4$=H, $C_1$-$C_4$ alkylcarboxy, oligo(ethylene glycol)carboxy, nitrile, $C_1$-$C_6$ alkyl, phenyl, or $C_2$-$C_4$ alkanoate.

BRIEF DESCRIPTION OF THE DRAWINGS

The FIGURE is a schematic depiction of a solid state battery according to one or more embodiments disclosed herein.

DETAILED DESCRIPTION

Embodiments of the present disclosure are described herein. It is to be understood, however, that the disclosed embodiments are merely examples and other embodiments may take various and alternative forms. The FIGURE is not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

In this disclosure, the terms "negative electrode" and "anode" are both used to mean "negative electrode." Likewise, the terms "positive electrode" and "cathode" are both used to mean "positive electrode."

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Reference is being made in detail to compositions, embodiments, and methods of embodiments known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

While lithium-ion batteries have become common and their use wide-spread, lithium-ion batteries continue to have certain disadvantages. Therefore, alternative battery types have been developed with the hope of replacing traditional lithium-ion batteries. One of the alternatives are solid state batteries which feature both solid electrolyte and solid electrodes. Solid state batteries may be thinner, flexible and have more energy per unit weight than the traditional lithium-ion batteries. They may be much safer than lithium-ion batteries due to replacement of a liquid electrolyte with a solid electrolyte. Solid electrolyte may be inorganic or polymer.

A frequently used material used for production of polymer solid electrolytes has been poly(ethylene oxide) (PEO). But PEO has several drawbacks such as temperature-dependent ion conductivity and low stability under highly oxidizing conditions. PEO crystallizes at 60° C., below which point its ionic conductivity is severely reduced. PEO is stable only to about 3.8 V vs $Li^+/Li$, as higher voltages present oxidizing conditions that render PEO unstable. These two drawbacks limit the overall power, voltage, and temperature range at which batteries that use PEO electrolytes can operate. Other materials have been developed such as polycarbonate, polysiloxane, succinonitrile, or organic-inorganic hybrid composites. Yet, it would be useful to develop a material which would be highly stable at relatively high voltage, have good Li salt solubility, and Li ion conductivity.

Greater stability in traditional lithium batteries with liquid electrolyte is based primarily on the major components of the liquid electrolyte itself, of which usually more than 90% is an organic carbonate solvent and lithium salt, with the remainder made up of specialized small molecule additives which aid in stabilization of the electrolyte-electrode interfaces. In contrast, an addition of small molecules to solid electrolyte cells may be deleterious as the small molecules may migrate to a block copolymer separator and cause undesirable softening. Thus, a different approach has to be developed to improve performance and stability in solid state batteries.

In one or more embodiments discussed below, a material overcoming the above-mentioned drawbacks is disclosed. The material's structure is adapted to provide high ionic conductivity, stability, and good physical properties. The material includes a first polymer. The first polymer includes one or more phosphoester groups in its side chain(s). A phosphoester bond is a bond between the phosphorous atom of a phosphate group and an oxygen atom.

The first polymer has a general formula (I):

where

R is naught, $C_1$-$C_4$ alkyl, $C_1$-$C_4$ perfluoroalkyl, or $C_1$-$C_4$ alkanone, X is naught, O, S, or $NR^1$, and $R^1$, $R^2$ are H, $C_1$-$C_8$ alkyl, $C_2$-$C_4$ cycloalkyl, $C_1$-$C_8$ perfluoroalkyl, aryl, phenyl, or 1,2-phenylene.

The first polymer based on repeating phosphoesters features a variety of advantages. For example, due to their polarity, polymeric phosphoesters that contain a P=O bond can readily dissolve metal salts to provide a path for ionic conduction. Polymeric phosphoesters are generally non-crystalline and amorphous with low glass transition temperatures. As a result, they do not experience a drop in ionic conductivity due to crystallization over a wide range of operating temperatures. Polymeric phosphoesters are highly oxidized, and thus flame retarding, making it difficult for further oxidization to occur and rendering them very stable at highly oxidizing voltages, for example, at a battery cathode.

The first polymer may be thus utilized in a variety of ways in a solid state battery. For example, the first polymer may be used as a cathode material. More specifically, the first polymer may be used as a solid state electrolyte in the cathode or catholyte. Additionally, the first polymer may be also used as a binder for cathode active material particles, holding or drawing the active material particles together to help achieve a cohesive cathode structure. The first polymer may form a coating on the active material particles. Due to the first polymer's affinity to metal oxide surfaces, the first polymer may form a layer encompassing the active material particles of the highly oxidizing cathode material.

Resistance to oxidation makes the first polymer especially useful in and near the cathode as the first polymer may provide ionic conductivity while remaining stable against a strong oxidizing voltage. A battery containing the first polymer as a cathode material may be operated at relatively high potential at oxidizing conditions. Phosphate polymers are stable to voltages as high as 4V and more. As discussed above, PEO electrolytes are stable only to 3.8V. With stability up to 4V and more, the first polymer offers the possibility of operating batteries at a voltage at least 5% higher than is possible in PEO-based batteries. A 5% increase in voltage results in a 5% increase in both battery power and battery energy, all other things being equal, which translates into a significant increase in battery performance.

A monomer of the first polymer may be copolymerized in either a random or block pattern with other monomers that contribute additional functionality. Examples of additional functionalities that can be useful include high polarity, suppressed glass transition temperature, single ion conductivity, or specific binding to a cathode active material. For example, the first polymer may be combined with a second polymer of the general formula (II):

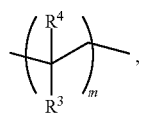
(II)

where $R^3$, $R^4$=H, $C_1$-$C_4$ alkylcarboxy, oligo(ethylene glycol) carboxy, nitrile, $C_1$-$C_6$ alkyl, phenyl, or $C_2$-$C_4$ alkanoate.

The first and the second polymers may form a random copolymer of the general formula (III):

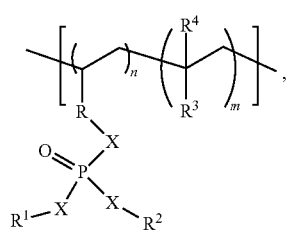
(III)

where

R is naught, $C_1$-$C_4$ alkyl, $C_1$-$C_4$ perfluoroalkyl, or $C_1$-$C_4$ alkanone, X is naught, O, S, or $NR^1$, $R^1$, $R^2$ are H, $C_1$-$C_8$ alkyl, $C_2$-$C_4$ cycloalkyl, $C_1$-$C_8$ perfluoroalkyl, aryl, phenyl, or 1,2-phenylene, and $R^3$, $R^4$=H, $C_1$-$C_4$ alkylcarboxy, oligo(ethylene glycol) carboxy, nitrile, $C_1$-$C_6$ alkyl, phenyl, or $C_2$-$C_4$ alkanoate.

Alternatively, the first and second polymers may form a block copolymer of the general formula (IV):

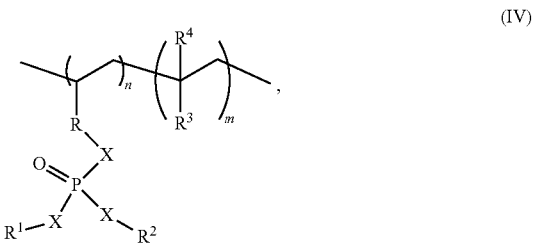
(IV)

where

R is naught, $C_1$-$C_4$ alkyl, $C_1$-$C_4$ perfluoroalkyl, or $C_1$-$C_4$ alkanone, X is naught, O, S, or $NR^1$, $R^1$, $R^2$ are H, $C_1$-$C_8$ alkyl, $C_2$-$C_4$ cycloalkyl, $C_1$-$C_8$ perfluoroalkyl, aryl, phenyl, or 1,2-phenylene, and $R^3$, $R^4$=H, $C_1$-$C_4$ alkylcarboxy, oligo(ethylene glycol) carboxy, nitrile, $C_1$-$C_6$ alkyl, phenyl, or $C_2$-$C_4$ alkanoate.

It is contemplated that a cathode material may contain a residual amount of strong basic or nucleophilic species like LiOH, which could be involved in reactions resulting in breakage of the P—X bond of the polymers of the formulas (I), (III), and (IV). Yet, if the P—X bond is broken in the structures, the polymer backbone is unchanged since the P—X is located in the side chain. The main polymer backbone, containing C—C bonds, is thus stable as the C—C bond is relatively difficult to break. Having the P—X bond in the sidechain thus increases the overall stability of the polymer structures of the formulas (I), (III), and (IV) while providing the benefits associated with having the one or more phosphoester groups in the polymer.

The polymers of the formulas (I), (III), and (IV) having one or more phosphoester group in their side chain(s) have good stability to high voltages of >3.6V when compared to Lr/Li, good Li salt solubility and $Li^+$ ion conductivity provided by the polar phosphoester group, and greater polymer stability than polymers incorporating the phosphoester group(s) into the polymer main chain.

The polymers of the formulas (I), (III), and (IV) may be combined with a metal salt to provide ionic conductivity. The polymers of the formulas (I), (III), and (IV) may be combined with the following non-limiting example metal salts having the general formula $$MX_n \qquad (V),$$

where

M is Li, Na, K, Ca, or Mg,

X is triflate, bis(trifluoromethanesulfonimide), bis(perfluoroethylsulfonylimide), $ClO_4$, bis(oxalate-borate), $BF_4$, $B(CN)_4$, or $PF_6$, and n is 1 or 2, specifically n=1 for Li, Na, K and n=2 for Ca or Mg.

Other metals may be used, depending on the battery chemistry. The metal salts named above are suitable for a lithium battery cell. Other example salts may include NaTFSI or other salts appropriate for sodium ion insertion batteries with an anode such as organic carboxylates and a cathode such as hard carbon, hollow carbon nanowires, etc.

The first polymer may be fluorinated or perfluorinated. Fluorine may be introduced to the first polymer structure through the $R^1$ and $R^2$ groups depicted in the structures above. Fluorinated polymers may have different electrolyte properties, which may include better high-voltage stability and higher conductivity due to altering polymer/salt interactions and depressing the polymer glass transition temperature. Nafion is an example of a common, perfluorinated polymer electrolyte. Fluorinated electrolytes are typically unstable to the reducing potentials at the lithium anode, may be used in a cathode due to physical isolation from the anode.

A schematic example embodiment of a solid state battery or battery cell 100 according to one or more embodiments disclosed herein is depicted in the FIGURE. As can be seen in the FIGURE, a solid state battery/battery cell 100 includes a cathode 110, an anode 112, and a separator electrolyte 114. The cathode 110 may include active material particles 116 surrounded by catholyte 118. The catholyte 118 may provide ionic communication between the separator electrolyte 114 and the cathode active particles 116. The catholyte 118 may include the first polymer or the copolymer. The catholyte 118 may act as a binder of the active material particles 116.

The active material particles 116 may include a coating 120. The coating 120 may include the first polymer or the copolymers discussed herein. The coating 120 is oxidatively stable to the potential at which the cathode 110 operates. The catholyte 118 may have higher ionic conductivity than the coating 120, improved binding properties to maintain structural integrity of the cathode composite, or both. The polymers of the formulas (I), (III), and/or (IV) may act as a binding agent when mixed with redox-active, ionically intercalating/deintercalating cathode active material particles 116 to form the cathode film or coating 120. Other binders such as polyvinylidene fluoride (PVDF) may be used to increase cohesiveness among the coated cathode active material particles 116 in the alternative or in addition to the first polymer and the copolymers of formulas (III) and (IV).

The coating 120 may be uniform or non-uniform having the same or different thickness, respectively. The same or different thickness may relate to a single active material particle 116 or more than one active material particles 116. The coating 120 may be a thin film coating having a thickness from about 1 to 500, 10 to 250, or 50 to 100 nm. The coating 120 may cover an entire or partial surface of the active material particles 116. The coating 120 may cover 20, 30, 40, 50, 60 70, 80, 90% or more of an active material particle 116 surface area. All cathode active particles 116 may include a coating 120. Alternatively, at least a portion of the cathode active particles 116 may be free from the coating 120.

The coating 120 and the catholyte 118 may be the same or different material. For example, both the coating 120 and the catholyte 118 may include the first polymer, the copolymers of formulas (III) and (IV) or a combination thereof. Alternatively, the coating 120 may have a different composition than the first polymer, the copolymers of formulas (III) and (IV) or a combination thereof forming the catholyte 118. Alternatively still, the coating 120 may include the first polymer, the copolymers of formulas (III) and (IV) or a combination thereof while the catholyte 118 may chemically differ from the coating 120.

The cathode active material may include, but is not limited to, lithium iron phosphate (LiFePO$_4$, LFP), LiCoO$_2$, LiMn$_2$O$_4$, lithium nickel cobalt aluminum oxide (LiNiCoAlO$_2$, NCA), lithium nickel cobalt manganese oxide (LiNiMnCo, NCM), or a combination thereof. Alternatively, the first polymer may be mixed with non-intercalating cathode active material particles 116 to form a cathode film or coating 120. Examples of such cathode active material include, but are not limited to, sulfur, microstructured carbon/sulfur composites, lithium peroxides, metal alloys of lithium, and organometallic molecules such as ferrocenes. The cathode film or coating 120 may also include agents such as carbon black to provide increased electrical conductivity, other polymers such as PEO to provide additional ionic conductivity, additional polymers such as polyvinylidene fluoride (PVDF) or polystyrene (PS) to provide improved mechanical strength, the like, or a combination thereof.

The cathode active material particles 116 may include one or more of the following: sulfur, microstructured carbon/sulfur composites, lithium peroxides, metal alloys of lithium, or organometallic molecules.

The cathode active material may be any of a variety of materials depending on the type of chemistry for which the battery cell 100 is designed. The battery 100 may be a lithium or lithium ion cell. The cathode active material may be any material that can serve as a host material for lithium ions. Examples of such materials include, but are not limited to materials described by the general formula

$$Li_xA_{1-y}M_yO_2 \qquad (VI),$$

where

A is at least one transition metal such as Mn, Co, and Ni,

M is B, Mg, Ca, Sr, Ba, Ti, V, Cr, Mn, Fe, Co, Ni, Cu, Al, In, Nb, Mo, W, Y, and Rh, or a combination thereof, x is 0.05≤x≤1.1, and y is 0≤y≤0.5.

An example cathode material is LiNi$_{0.5}$Mn$_{0.5}$O$_2$.

Alternatively, the cathode active material may be described by the general formula

$$Li_xMn_{2-y}M_yO_2 \qquad (VII),$$

where

M is Mn, Ni, Co, Cr, or a combination thereof, x is 0.05≤x≤1.1, and y is 0≤y≤2.

Alternatively still, the cathode active material may be described by the general formula

$$Li_xMn_7Mn_{4-y}O_8 \qquad (VIII),$$

where

M is Fe, Co, or both, x is 0.05≤x≤2, and y is 0≤y≤4.

The cathode electrode active material may be described by the general formula

$$Li_x(Fe_yM_{1-y})PO_4 \qquad (IX),$$

where

M is chosen from transition metals such as Mn, Co and/or Ni, x is 0.9≤x≤1.1, and y is 0≤y≤1.

In yet another embodiment, the cathode active material may be described by the general formula:

$$Li(Ni_{0.5-x}Co_{0.5-x}M_{2x})O_2 \qquad (X),$$

where

M is chosen from Al, Mg, Mn, and/or Ti, and x is 0≤x≤0.2.

The cathode active material may include LiNiVO$_2$.

The cathode active material particles may include lithium iron phosphate (LFP), LiCoO$_2$, LiMn$_2$O$_4$, lithium nickel cobalt aluminum oxide (NCA), lithium nickel cobalt manganese oxide (NCM), or a combination thereof.

In another embodiment, the cathode active material particles may include sulfur, microstructured carbon/sulfur composites, lithium peroxides, metal alloys of lithium, organometallic molecules, or a combination thereof.

The separator electrolyte 114 may be PEO-based. When a PEO-based electrolyte is used in the separator between the cathode 110 and the anode 112, it may be useful to include some PEO in the cathode 110 to improve interfacial ionic transfer between the cathode 110 and the separator electrolyte 114. PEO may be added to the cathode 110 through intimate mixing with other cathode components. Alternatively, PEO may be added to the cathode 110 in the form of a PEO-PPE (poly phenylene ether) block copolymer. In yet another embodiment, PEO or a PEO-PPE block copolymer may be used as an intermediate layer between the cathode 110 and the separator electrolyte 114. Other electrolytes commonly used as the separator electrolyte 114 may include, but are not limited to, PS-PEO block copolymers and PPE-PEO block copolymers. Electronically conductive block copolymers based on PPE may be added to the cathode 110. Examples include, but are not limited to, block copolymers of PPE and electronically conductive polymers such as polythiophene, polyvinylphenylene, polyaniline, polypyrrole, polyacetylene, polyphenylene sulfide, poly(3,4-ethylenedioxythiophene) (pedot), or polyfluorenes.

The anode 112 active material may include any of a variety of materials depending on the type of chemistry for which the battery cell 100 is designed. The anode 112 material may include any material that can serve as a host material (i.e., can absorb and release) lithium ions. Examples of such materials include, but are not limited to graphite, lithium metal, and lithium alloys such as Li—Al, Li—Si, Li—Sn, and Li—Mg, Si and silicon alloys of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr), and mixtures thereof. Alternatively, graphite, metal oxides, silicon oxides, or silicon carbides may also be used as anode 112 materials.

In one or more embodiments, a process for production of the cathode material and the battery is disclosed. The first polymer may be synthesized using radical polymerization techniques, including both free radical polymerizations and controlled radical polymerizations (NMP, ATRP, RAFT). These methods are able to generate high molecular weight polymers with less difficulty than condensation and ring-opening polymerization methods. Foremost, impurities are less likely to interfere with radical reaction pathways. Care should be taken with radical reactions to remove dioxygen, which is a well-known interference.

A non-limiting example of a polymer synthesis of the first polymer of the general formula (I) may be synthesis of diethyl vinyl phosphate (DEVP). 50 g of 45 wt. % aqueous chloroacetaldehyde is stirred with 250 mL dichloromethane and 25 g anhydrous magnesium sulfate for 1 h, then filtered. To the filtrate is added dropwise triethyl phosphite (47.6 g), following which the mixture is heated to reflux for 1 h. The mixture is then purified by vacuum distillation, isolating the desired product at 90-95° C. at 5 torr. This fraction is redistilled under vacuum to DEVP in 61% yield and >90% purity.

Another example includes synthesis of poly-DEVP. A flask is charged with DEVP (16 g), triethyl phosphite (160 mg) and 2,2'-azobisisobutyrylnitrile (AIBN, 160 mg) and closed. The mixture is degassed by applying vacuum at room temperature to <=1 torr, stirring 1 minute, then refilling with argon, then repeating these steps through two more cycles. The reaction flask is then heated to 80° C. using a thermostat-controlled oil bath for 2 h. The flask is cooled, and the contents are diluted with tetrahydrofuran (32 mL) and poured into hexane (150 mL) to precipitate the polymer. The polymer is reprecipitated once from THF/hexane to give PDEVP as a yellow, tacky gel. Gel permeation chromatography (DMF, vs PEO standards): Mn 22,900, PDI 2.55.

An example synthesis of dimethylphosphonomethyl acrylate (DMPA) may include charging a flask with dimethylphosphite (11 g), paraformaldehyde (3.0 g), potassium carbonate (0.69 g), and methanol and closed. The mixture is stirred for 3 hours until it turns clear transparent solution. The solvent is removed under reduced pressure and the concentrated oily product hydroxymethyldimethylphosphonate is purified by passing through a silica plug. To the solution of hydroxymethyldimethylphosphonate (8.5 g) and triethylamine (12.26 g) in dry THF (250 mL), is added acryloryl chloride (6.6 g) in dropwise. The resulting mixture is allowed to stir overnight and then is diluted with water and extracted with ethyl acetate. The extracts are combined and washed with water and brine, dried over magnesium sulfate, and concentrated under reduced pressure to yield crude product DMPA. The crude product is purified by passing through a silica gel column to yield pure DMPA 10 g in 85% yield.

An example synthesis of poly-dimethylphosphonomethyl acrylate (PDMPA) has been disclosed for example in U.S. Pat. Nos. 2,934,555, 3,030,347, or U.S. Patent Publication No. 2013/0131258, content of which is hereby incorporated by reference. A solution of DMPA (2 g) and AIBN (8.4 mg) in DMF (2.5 g) is degassed and heated to 80° C. with stirring for 12 hours. The resulting viscous solution is cooled to room temperature and precipitated in ditheyl ether to yield the product PDMPA as a viscous solid.

An example synthesis of P(DMPA-co-AN) includes degassing a solution of DMPA (5 g), acrylonitrile (5 g), and AIBN (50 mg) in DMF (10 g) and heating the solution to 80° C. with stirring for 12 hours. The resulting viscous solution is cooled to room temperature and precipitated in diethyl ether to yield the product P(DMPA-co-AN) as a solid.

A non-limiting example of the cathode may be made by using PDMPA as the polymer of the catholyte. The composition is lithium nickel cobalt aluminum oxide (61 wt. %), acetylene carbon (4 wt. %), PDMPA (27 wt. %), lithium bis(oxalate)borate (3 wt. %), and polyvinyldifluoride (5 wt. %). The cathode is made by a solution casting method. The materials are dispersed/dissolved in dimethylformamide with a solid weight percentage of 36 wt. %. The obtained slurry is casted on carbon-coated aluminum foil and dried at 60° C. The loading of the cathode is about 4.2 mg/cm$^2$.

A non-limiting example of an assembled all-solid-state battery cell with the cathode material described above may be built. The example battery cell may include a laminate structure including discreet layers of the cathode/polymer or separator electrolyte/anode. The anode may be a lithium anode. The polymer/separator electrolyte may be composed of an ethylene oxide-styrene copolymer and lithium bis(oxalate)borate and/or another material. The molar ratio n(ethylene oxide)/n(lithium) may be about 0.085. The thickness of the polymer electrolyte may be about 10-30, 12-25, or 15-20μ. The thickness of the lithium layer may be about 5-50, 10-40, or 20-30μ. The laminate may be placed into and sealed in a pouch. The battery cell may be cycled at either 3V-4.2V or 3V-4.3V.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A solid state battery cathode material comprising:
cathode active material particles comprising $LiFePO_4$, $LiCoO_2$, $LiMn_2O_4$, $LiNiCOAlO_2$, $LiNiMnCoO_2$, or a combination thereof, and
a first polymer of the general formula (I):

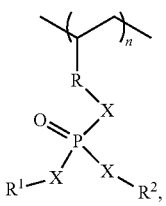
(I)

where
R is naught, $C_1$-$C_4$ alkyl, $C_1$-$C_4$ perfluoroalkyl, or $C_1$-$C_4$ alkanone,
X is naught, O, S, or $NR^1$, and
$R^1$, $R^2$ are H, $C_1$-$C_8$ alkyl, $C_2$-$C_4$ cycloalkyl, $C_1$-$C_8$ perfluoroalkyl, aryl, phenyl, or 1,2-phenylene,
the first polymer forming a coating on the cathode active material particles.

2. The cathode material of claim 1, wherein the first polymer is a binder between cathode active material particles.

3. The cathode material of claim 1, further comprising a second polymer of the general formula (II):

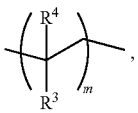
(II)

where
$R^3$, $R^4$=H, $C_1$-$C_4$ alkylcarboxy, oligo(ethylene glycol) carboxy, nitrile, $C_1$-$C_6$ alkyl, phenyl, or $C_2$-$C_4$ alkanoate.

4. The cathode material of claim 3, wherein the first and second polymers form a random copolymer of the general formula (III):

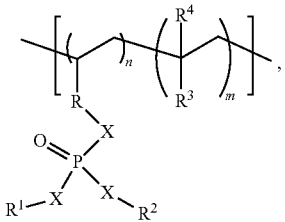
(III)

where
R is naught, $C_1$-$C_4$ alkyl, $C_1$-$C_4$ perfluoroalkyl, or $C_1$-$C_4$ alkanone,
X is naught, O, S, or $NR^1$,
$R^1$, $R^2$ are H, $C_1$-$C_8$ alkyl, $C_2$-$C_4$ cycloalkyl, $C_1$-$C_8$ perfluoroalkyl, aryl, phenyl, or 1,2-phenylene, and
$R^3$, $R^4$=H, $C_1$-$C_4$ alkylcarboxy, oligo(ethylene glycol) carboxy, nitrile, $C_1$-$C_6$ alkyl, phenyl, or $C_2$-$C_4$ alkanoate.

5. The cathode material of claim 3, wherein the first and second polymers form a block copolymer of the general formula (IV):

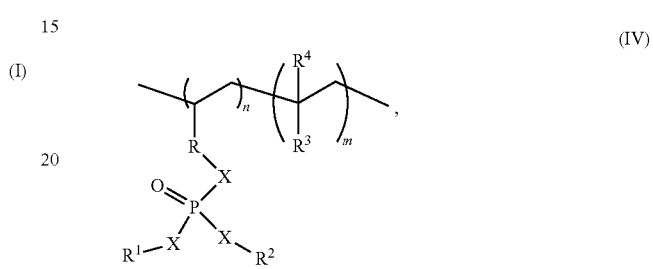
(IV)

where
R is naught, $C_1$-$C_4$ alkyl, $C_1$-$C_4$ perfluoroalkyl, or $C_1$-$C_4$ alkanone,
X is naught, O, S, or $NR^1$,
$R^1$, $R^2$ are H, $C_1$-$C_8$ alkyl, $C_2$-$C_4$ cycloalkyl, $C_1$-$C_8$ perfluoroalkyl, aryl, phenyl, or 1,2-phenylene, and
$R^3$, $R^4$=H, $C_1$-$C_4$ alkylcarboxy, oligo(ethylene glycol) carboxy, nitrile, $C_1$-$C_6$ alkyl, phenyl, or $C_2$-$C_4$ alkanoate.

6. The cathode material of claim 1, further comprising one or more metal salts mixed in the first polymer.

7. The cathode material of claim 6, wherein the one or more metals salts have the general formula (V)

$$MX_n \qquad (V),$$

where
M is Li, Na, K, Ca, or Mg,
X is triflate, bis(trifluoromethanesulfonimide), bis(perfluoroethylsulfonylimide), $ClO_4$, bis(oxalate-borate), $BF_4$, $B(CN)_4$, or $PF_6$, and
n is 1 or 2.

8. A solid state polymer battery comprising:
an anode;
a cathode having a catholyte comprising a first polymer of the general formula (I):

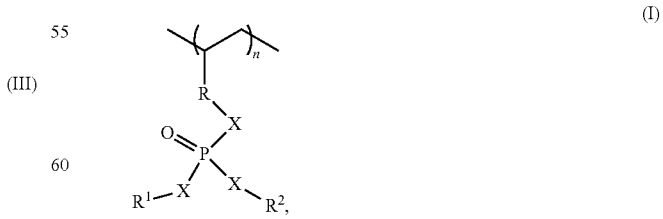
(I)

where
R is naught, $C_1$-$C_4$ alkyl, $C_1$-$C_4$ perfluoroalkyl, or $C_1$-$C_4$ alkanone,
X is naught, O, S, or $NR^1$, and $R^1$, $R^2$ are H, $C_1$-$C_8$ alkyl, $C_2$-$C_4$ cycloalkyl, $C_1$-$C_8$ perfluoroalkyl, aryl, phenyl, or 1,2-phenylene; and
a separator electrolyte.

9. The solid state polymer battery of claim 8, wherein the cathode further comprises active material particles and the first polymer forms a coating on the particles.

10. The solid state polymer battery of claim 8, wherein the cathode active material particles comprise $LiFePO_4$, $LiCoO_2$, $LiMn_2O_4$, $LiNiCoAlO_2$, $LiNiMnCoO_2$, or a combination thereof.

11. The solid state polymer battery of claim 8, wherein the cathode further comprises a second polymer such that the first and second polymers form a copolymer of the general formula (III) or (IV):

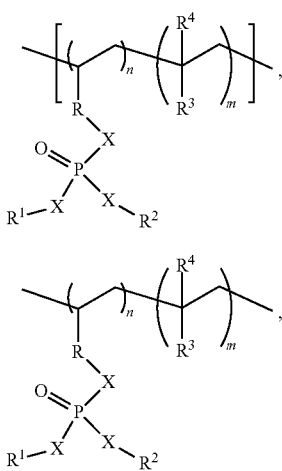

where
R is naught, $C_1$-$C_4$ alkyl, $C_1$-$C_4$ perfluoroalkyl, or $C_1$-$C_4$ alkanone,
X is naught, O, S, or $NR^1$,
$R^1$, $R^2$ are H, $C_1$-$C_8$ alkyl, $C_2$-$C_4$ cycloalkyl, $C_1$-$C_8$ perfluoroalkyl, aryl, phenyl, or 1,2-phenylene, and
$R^3$, $R^4$=H, $C_1$-$C_4$ alkylcarboxy, oligo(ethylene glycol) carboxy, nitrile, $C_1$-$C_6$ alkyl, phenyl, or $C_2$-$C_4$ alkanoate.

12. The solid state polymer battery of claim 8, wherein the anode comprises graphite, lithium metal lithium alloy(s), silicon, silicon alloy(s), metal oxide(s), silicon oxide(s), silicon carbide(s), or a combination thereof.

13. A solid state battery catholyte comprising:
a first polymer of the general formula (I):

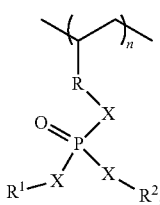

where
R is naught, $C_1$-$C_4$ alkyl, $C_1$-$C_4$ perfluoroalkyl, or $C_1$-$C_4$ alkanone,
X is naught, O, S, or $NR^1$, and $R^1$, $R^2$ are H, $C_1$-$C_8$ alkyl, $C_2$-$C_4$ cycloalkyl, $C_1$-$C_8$ perfluoroalkyl, aryl, phenyl, or 1,2-phenylene.

14. The catholyte of claim 13, further comprising one or more metal salts of the general formula (V)

$$MX_n \qquad (V),$$

where
M si Li, Na, K, Ca, or Mg,
X is triflate, bis(trifluoromethanesulfonimide), bis(perfluoroethylsulfonylimide), $ClO_4$, bis(oxalate-borate), $BF_4$, $B(CN)_4$, or $PF_6$, and
n is 1 or 2.

15. The catholyte of claim 13, further comprising a second polymer of the general formula (II):

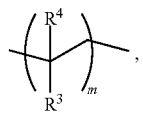

where
$R^3$, $R^4$=H, $C_1$-$C_4$ alkylcarboxy, oligo(ethylene glycol) carboxy, nitrile, $C_1$-$C_6$ alkyl, phenyl, or $C_2$-$C_4$ alkanoate.

16. The catholyte of claim 15, wherein the first and second polymers form a random copolymer of the general formula (III):

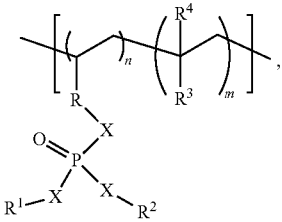

where
R is naught, $C_1$-$C_4$ alkyl, $C_1$-$C_4$ perfluoroalkyl, or $C_1$-$C_4$ alkanone,
X is naught, O, S, or $NR^1$,
$R^1$, $R^2$ are H, $C_1$-$C_8$ alkyl, $C_2$-$C_4$ cycloalkyl, $C_1$-$C_8$ perfluoroalkyl, aryl, phenyl, or 1,2-phenylene, and
$R^3$, $R^4$=H, $C_1$-$C_4$ alkylcarboxy, oligo(ethylene glycol) carboxy, nitrile, $C_1$-$C_6$ alkyl, phenyl, or $C_2$-$C_4$ alkanoate.

17. The catholyte of claim 15, wherein the first and second polymers form a block copolymer of the general formula (IV):

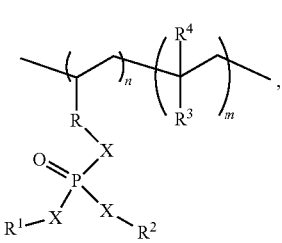

where
R is naught, $C_1$-$C_4$ alkyl, $C_1$-$C_4$ perfluoroalkyl, or $C_1$-$C_4$ alkanone, X is naught, O, S, or $NR^1$, $R^1$, $R^2$ are H, $C_1$-$C_8$ alkyl, $C_2$-$C_4$ cycloalkyl, $C_1$-$C_8$ perfluoroalkyl, aryl, phenyl, or 1,2-phenylene, and $R^3$, $R^4$=H, $C_1$-$C_4$ alkylcarboxy, oligo(ethylene glycol) carboxy, nitrile, $C_1$-$C_6$ alkyl, phenyl, or $C_2$-$C_4$ alkanoate.

* * * * *

UNITED STATES PATENT AND TRADEMARK OFFICE
CERTIFICATE OF CORRECTION

| | |
|---|---|
| PATENT NO. | : 10,957,904 B2 |
| APPLICATION NO. | : 16/430920 |
| DATED | : March 23, 2021 |
| INVENTOR(S) | : Russell Pratt et al. |

It is certified that error appears in the above-identified patent and that said Letters Patent is hereby corrected as shown below:

In the Claims

Column 13, Line 11, Claim 1:
After "$LiMn_2O_4$"
Delete "$LiNiCOA1O_2$"
Insert --"$LiNiCoAlO_2$"--.

Column 13, Lines 11-12, Claim 1:
After "or a combination thereof"
Delete ","
Insert --";"--.

Signed and Sealed this
Eleventh Day of April, 2023

Katherine Kelly Vidal
*Director of the United States Patent and Trademark Office*